US008667464B2

(12) United States Patent
Crippa et al.

(10) Patent No.: US 8,667,464 B2
(45) Date of Patent: Mar. 4, 2014

(54) COMPANY ADVANCED PROGRAMMING INTERFACE

(75) Inventors: Gianluigi Crippa, Vigano (IT); Radovan Bakos, Likavka (SK)

(73) Assignee: Honeywell Technologies SARL, Rolle (CH)

( * ) Notice: Subject to any disclaimer, the term of this patent is extended or adjusted under 35 U.S.C. 154(b) by 875 days.

(21) Appl. No.: 12/728,134

(22) Filed: Mar. 19, 2010

(65) Prior Publication Data
US 2011/0231815 A1 Sep. 22, 2011

(51) Int. Cl.
G06F 9/44 (2006.01)
G06F 9/45 (2006.01)
G06F 3/00 (2006.01)

(52) U.S. Cl.
USPC ........... 717/113; 717/106; 717/110; 717/121; 717/173; 715/762

(58) Field of Classification Search
None
See application file for complete search history.

(56) References Cited

U.S. PATENT DOCUMENTS

| 5,481,716 | A | * | 1/1996 | Morshedi et al. | 717/106 |
|---|---|---|---|---|---|
| 5,995,757 | A | * | 11/1999 | Amberg et al. | 717/175 |
| 6,360,360 | B1 | * | 3/2002 | Bates et al. | 717/160 |
| 6,401,237 | B1 | * | 6/2002 | Ishikawa | 717/113 |
| 7,086,009 | B2 | | 8/2006 | Resnick et al. | |
| 7,620,907 | B2 | | 11/2009 | Resnick et al. | |
| 7,802,246 | B1 | * | 9/2010 | Kennedy et al. | 717/173 |
| 8,285,578 | B2 | * | 10/2012 | Sheppard | 705/7.13 |
| 8,522,201 | B2 | * | 8/2013 | Elmieh et al. | 717/110 |
| 2002/0087944 | A1 | * | 7/2002 | David | 717/100 |
| 2002/0099456 | A1 | | 7/2002 | McLean | |
| 2003/0009250 | A1 | * | 1/2003 | Resnick et al. | 700/94 |
| 2003/0014387 | A1 | * | 1/2003 | Kreidler et al. | 707/1 |
| 2004/0268345 | A1 | * | 12/2004 | Lodwick et al. | 717/176 |

(Continued)

FOREIGN PATENT DOCUMENTS

WO 9850830 11/1998

OTHER PUBLICATIONS

Peter Brusilovsky et al., "User as Student: Towards an Adaptive Interface for Advanced Web-Based Applications", [Online], 1997, pp. 177-188, [Retrieved from Internet on Oct. 2, 2013], <http://www2.sis.pitt.edu/~peterb/papers/UM97.pdf>.*

(Continued)

Primary Examiner — Thuy Dao
Assistant Examiner — Ziaul A Chowdhury
(74) Attorney, Agent, or Firm — Seager, Tufte & Wickhem LLC

(57) ABSTRACT

An approach which may be regarded as a company advanced programming interface (CAPI) applicable, for instance, to boiler displays and remote man-machine interfaces. CAPI may use a product software structure combined with a personal computer (PC) or web based program capable of creating an embedded microcontroller program without a need for programming capabilities or a program recompile. Implementation may be done at both the product microcontroller level and the PC or web based program to be used by an end customer to "customize" its product. The present approach may partially move development and final tuning processes to an original equipment manufacturers (OEM). Modifications of the product may be done without a need for specific and expensive software development tools for embedded devices such as a compiler and a debugger, and hardware tools for simulation and analysis, and other like items. The present approach may also provide immediate response to simple OEM requirements.

20 Claims, 14 Drawing Sheets

(56) References Cited

U.S. PATENT DOCUMENTS

| | | | |
|---|---|---|---|
| 2005/0055688 A1 | 3/2005 | Barajas et al. | |
| 2006/0015844 A1* | 1/2006 | Johnson et al. | 717/106 |
| 2006/0277463 A1* | 12/2006 | Mann et al. | 715/523 |
| 2007/0006149 A1* | 1/2007 | Resnick et al. | 717/116 |
| 2007/0168874 A1* | 7/2007 | Kloeffer et al. | 715/764 |
| 2007/0240095 A1* | 10/2007 | Shih et al. | 717/100 |
| 2008/0098380 A1* | 4/2008 | Klusmeyer | 717/168 |
| 2009/0144730 A1* | 6/2009 | Chen et al. | 717/178 |
| 2009/0254392 A1* | 10/2009 | Zander | 705/7 |
| 2010/0169806 A1* | 7/2010 | Ku et al. | 715/762 |
| 2011/0055823 A1* | 3/2011 | Nichols et al. | 717/174 |
| 2012/0246616 A1* | 9/2012 | Frontiero et al. | 717/121 |

OTHER PUBLICATIONS

A. Medl et al. "Multimodal Man-Machine Interface for Mission Planning", [Online], 1998, pp. 1-7, [Retrieved from Internet on Oct. 2, 2013], <http://citeseerx.ist.psu.edu/viewdoc/download?doi=10.1.1.56.5750&rep=rep1&type=pdf>.*

Hirokazu Nishitani, "Human-computer interaction in the new process technology", [Online], 1996, pp. 111-117, [Retrieved from Interent on Oct. 2, 2013], <http://ac.els-cdn.com/0959152496860537/1-s2.0-0959152496860537-main.pdf>.*

Norbert Kajler, "CAS/PI: a Portable and Extensible Interface for Computer Algebra Systems", [Online], ACM 1996, pp. 376-386, [Retrieved from Internet on Oct. 2, 2013], <http://delivery.acm.org/10.1145/150000/143359/p376-kajler.pdf>.*

\* cited by examiner

COMPANY ADVANCED PROGRAMMING INTERFACE

BACKGROUND

The invention pertains to programming and particularly to user interfaces. More particularly, the invention pertains to approaches to satisfy customer desires for modifying its products.

SUMMARY

The invention is an approach which may be regarded as a company advanced programming interface (CAPI) applicable, for instance, to boiler displays and remote man-machine interfaces. CAPI may use a product software structure combined with a PC or web based program capable of creating an embedded microcontroller program without a need for programming capabilities or a program recompile. Implementation may be done at the product microcontroller level and with a PC or web based program to be used by an OEM customer to "customize" its product. The present approach may partially move product development and final tuning processes to an OEM. Modifications of the product may be done without a need for specific and expensive software development tools for embedded devices such as a compiler and a debugger, and hardware tools for simulation and analysis, and other like items. The present approach may also provide an immediate response to simple OEM requirements.

DESCRIPTION

A need of flexibility on user interface and remote controls may be a key point for boiler manufacturers but can be in conflict with the time and cost related to development of a specific customized product.

Customers may often ask for a series of small adjustments during the development phase and expect a very quick response from the company's research and development department (R&D). Depending on type of project and customer's behavior, a project may require four to five iterations before final customer acceptance. Also, very small OEM's would like to have their product appear different; thus, one may expect a certain level of customization even if they do not have sufficient numbers to justify specific investments.

A company advanced programming interface (CAPI) may be an identified way to satisfy OEM requests without any additional R&D or marketing activity on a specific product, partially moving the development/final tuning process to an OEM, extend configurability of selected device's behavior up to a point to fully differentiate the product from similar ones, make modifications without a need of specific and expensive software development tools for embedded devices such as a compiler, require a debugger and additional hardware tools for simulation and analysis, and so forth, and provide an immediate response to OEM requirements.

CAPI may achieve these expectations, thanks to an advantageous product software structure combined with PC or WEB based programs. The PC may be a small general purpose computer which may be referred to just as a computer herein. A program may be able to create an embedded microcontroller program without a need of programming capabilities or a program recompile. In more detail, the product software may be created with the following approach and structure that makes the above items achievable. There may be a parameterization of constants plus software modules. The internal algorithms are not necessarily created as hard-coded functions but created like an interpreted "pseudocode" (e.g., a state machine of a user interface) which can be defined and/or modified by an OEM.

Additionally, there may be a definition of data structures holding a configuration and algorithms, a development of a PC tool for management of data structures (create/delete, modify/select, import/export, and so on), and a mechanism for storage and uploading structures to the device (communication line, i.e., serial line→protocol, i.e., XMODEM→microprocessor non-volatile memory, i.e., flash).

The CAPI approach may be applied to future boiler and other appliance displays and to a remote man-machine interface (MMI) within Europe's, North America's and the Asian- Pacific's combustion community. Implementation may be done at both the product microcontroller level and the PC based or WEB based program to be used by the end customer to "customize" its product.

Figure 1:
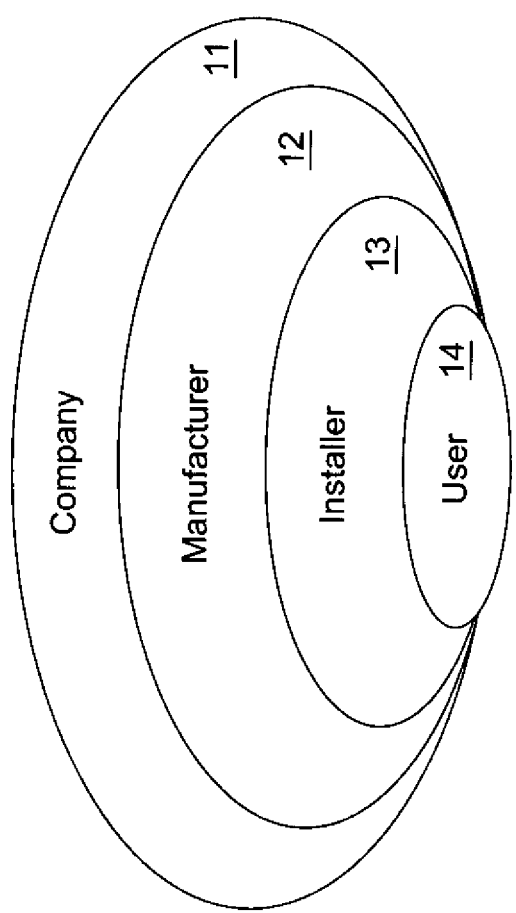
FIG. 1 is a diagram that illustrates a related relationship among the company, a manufacturer, an installer and a user, particularly relative to providing a product, its design and revisions and support with customized functionality.

The present device may be regarded as an adaptive man-machine interface. First, one may note the flexibility of related art devices. Layers of flexibility may be noted. A particular company, such as General Electric, Honeywell, General Motors and the like, which may be referred to as a "company", appears to have flexibility only at the level of design, as illustrated in FIG. 1, in that any changes in software would need to be re-compiled. This Figure illustrates a relationship among the company 11, a company's customer=manufacturer 12, installer 13 and user 14, referred to the need to provide flexibility and configurability of a product, its design and revisions and support. A company's customer=manufacturer 12, for instance a boiler manufacturer, may have many change requests. A customer does not necessarily have a way to adjust any settings on all produced units. So the customer may ask for a change of default settings at a level of design and production. The implementation and verification would be up to the company. If a customer is unable to change some parameters or needs adjustments which are not parameterized, the company should be involved. A setup of an installation by an installer 13 may be via a local built-in user interface (UI) or a PC. The setup may be one per device's lifetime. A user 14 may be switching operating modes, setpoints, schedules and so forth, via the user interface continuously.

Figure 2:
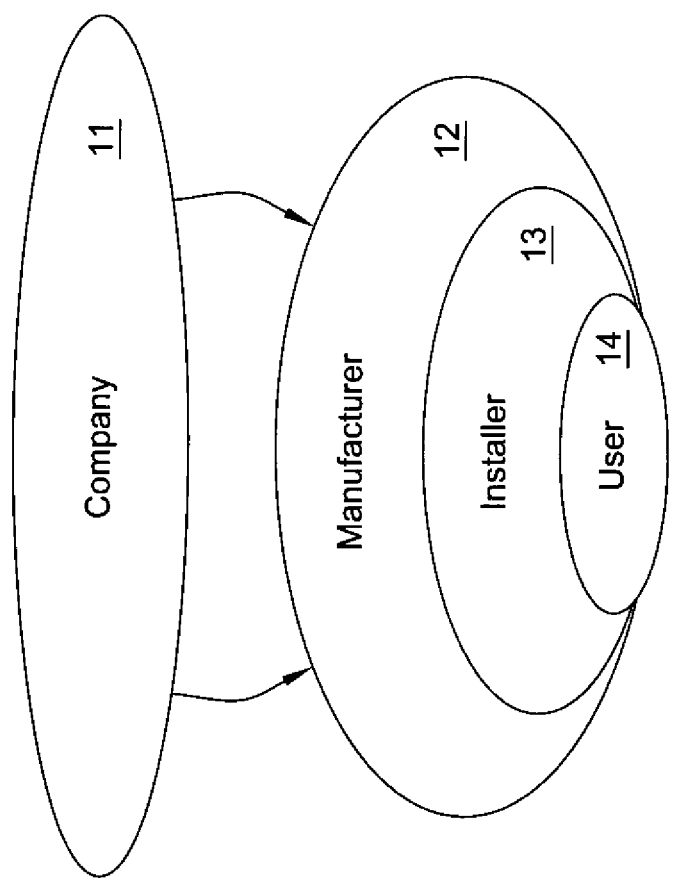
FIG. 2 is a diagram like that of FIG. 1 except that if CAPI is applied, a company will interact only with a manufacturer to provide a way to let the manufacturer implement a customized functionality required by the manufacturer itself, an installer and a user.

One may look at the company advanced programming interface (CAPI) for boiler and other appliance displays and remote MMI. The interface should not affect the flexibility at the level of the user 14 and installer 13. A focus may be on moving some adjustment and configuration tasks to the boiler manufacturer 12, as an example. Providing a flexible product with a CAPI software structure will remove a company portion from implementation of changes, settings and validation as illustrated in FIG. 2. Only interaction required is for implementing very special requests not foreseen into CAPI software structure. All parameters may have a numeric background. The CAPI PC software or the web based software may interpret these values in a human-readable form to avoid misinterpretation. The configuration may be meant as a set of objects which may have lists of tree-organized data structures, compared to a related-art way as a simple list of numeric values, while details of their meaning and relationship are described in the documentation.

As to protection of company 11 proprietary information, the boiler manufacturer 12 will not have access to source code, executable binary code, protocols, and algorithm implementation. The boiler manufacturer 12 may affect content of parameter variables, parameters of algorithms, a user interface state-machine, and binary data such as bitmaps, fonts, icons, and so on. An allowed degree of freedom may be fully under control of company 11.

A target is to protect the company's proprietary information, such as algorithms, protocols, and so on, and to protect the source code and locked binary in the microcode.

Steps to a desired flexibility may include parametization of constants plus software modules, and switching some of the internal algorithms from hard-code to interpreted "pseudocode" (e.g., state machines of a user interface, which may be defined or modified by the OEM). Steps may also include a development of language in how to describe structures and options, a definition of data structures holding a configuration and algorithms, a development of a PC tool for management of data structures (i.e., created/delete, modify/ select, import/export, and so on), and a mechanism for storage and uploading structures to the device (communication line, i.e., serial line→protocol, i.e., XMODEM→microprocessor non-volatile memory, i.e., flash).

Figure 3:
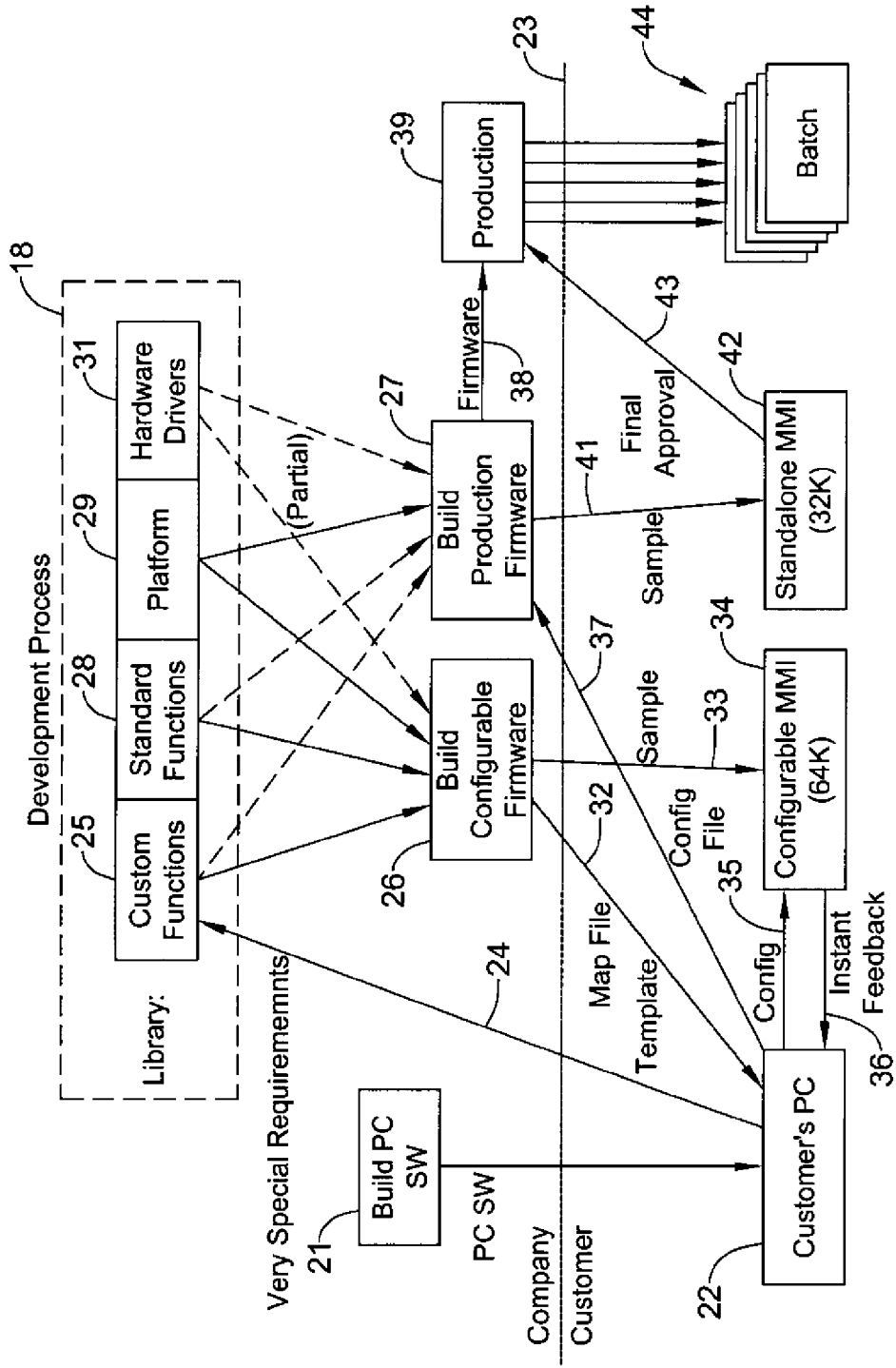
FIG. 3 is a diagram of a PC software oriented development process for firmware that shows capabilities using CAPI to reduce microcontroller non volatile memory space (e.g., flash, and so on)

FIG. 3 is a diagram of a development process for product with embedded CAPI software structure. The way of configuring a device may start by preparing PC software 21 by the company. This software may be distributed to the customer and installed on his PC 22. At the beginning of the development process is a set of configurable software functions in library 18. This library may contain hardware drivers 31, platform code 29, standard functions 28 and custom functions 25. During the compilation process, a configurable firmware 26 may be built. This firmware may be loaded as a program to the configurable MMI sample 34 and sent to the customer (33). A map file and template 32 may also be provided to the customer. A line 23 shows boundary between the company and customer areas. The customer may reconfigure the behavior of configurable MMI 34 using his PC 22 and the company provided software 21, uploading new configuration file 35 to configurable MMI 34. After uploading, the sample may start to behave according to the modifications made by the customer so it is providing instant feedback 36 to the customer about the effect of customer's changes. In case of very specific demands, customer may ask his special requirements 24 to be implemented into custom functions 25 of the library 18. On status, when customer is satisfied with his working sample of configurable man-machine interface device 34, a new production firmware 27 may be built using configuration file 37 coming from customer's PC 22 combined with only utilized functions from library 18, where custom functions 25 and standard functions 28 may be reduced while keeping functionality. If necessary, a sample 41 of standalone man-machine interface device 42 may be provided to the customer. Standalone man-machine interface device 42 may have equivalent functionality compared to the configurable man-machine interface device 34 but may require less memory space. After final approval 43 of the sample of device 42, production 39 may use firmware 38 to start serial production of batches 44 of devices.

Figure 4:
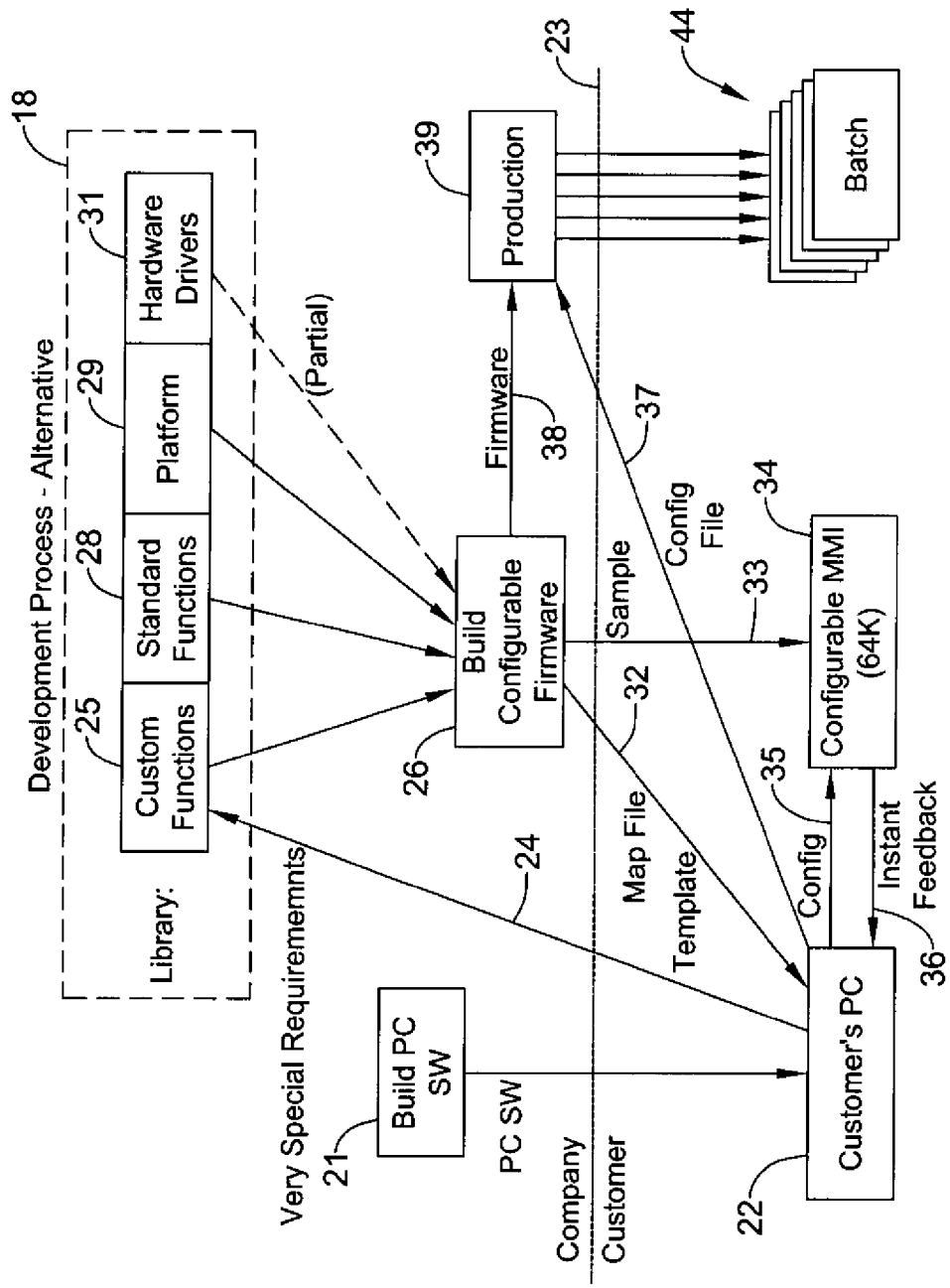
FIG. 4 is a diagram like that of FIG. 3 except that the diagram of FIG. 4 shows an alternative development process when CAPI capabilities are not used for non volatile memory space reduction and that final product will be similar to a sample provided.

FIG. 4 is a diagram of a development process for product with embedded CAPI software structure similar to the one in FIG. 3. The way of configuring device may start by preparing PC software 21 by the company. This software may be distributed to customer and installed on his PC 22. At the beginning of development process is a set of configurable software functions in library 18. This library may contain hardware drivers 31, platform code 29, standard functions 28 and custom functions 25. During the compilation process, a configurable firmware 26 may be built. This firmware may be loaded as a program to the configurable MMI sample 34 and sent to the customer (33). A map file and template 32 may also be provided to the customer. A line 23 shows boundary between the company and customer areas. The customer may reconfigure the behavior of configurable MMI 34 using his PC 22 and the company provided software 21, uploading new configuration file 35 to configurable MMI 34. After uploading, the sample may start to behave according to the modifications made by the customer so it is providing instant feedback 36 to the customer about the effect of customer's changes. In case of very specific demands, customer may ask his special requirements 24 to be implemented into custom functions 25 of the library 18. If customer is satisfied with his reconfiguration of the device, he may ask for a serial production of devices. In this case, configuration file 37 on customer's PC 22 combined with firmware 38 may be used by production department 39 to produce devices in batches 44.

Figure 5:
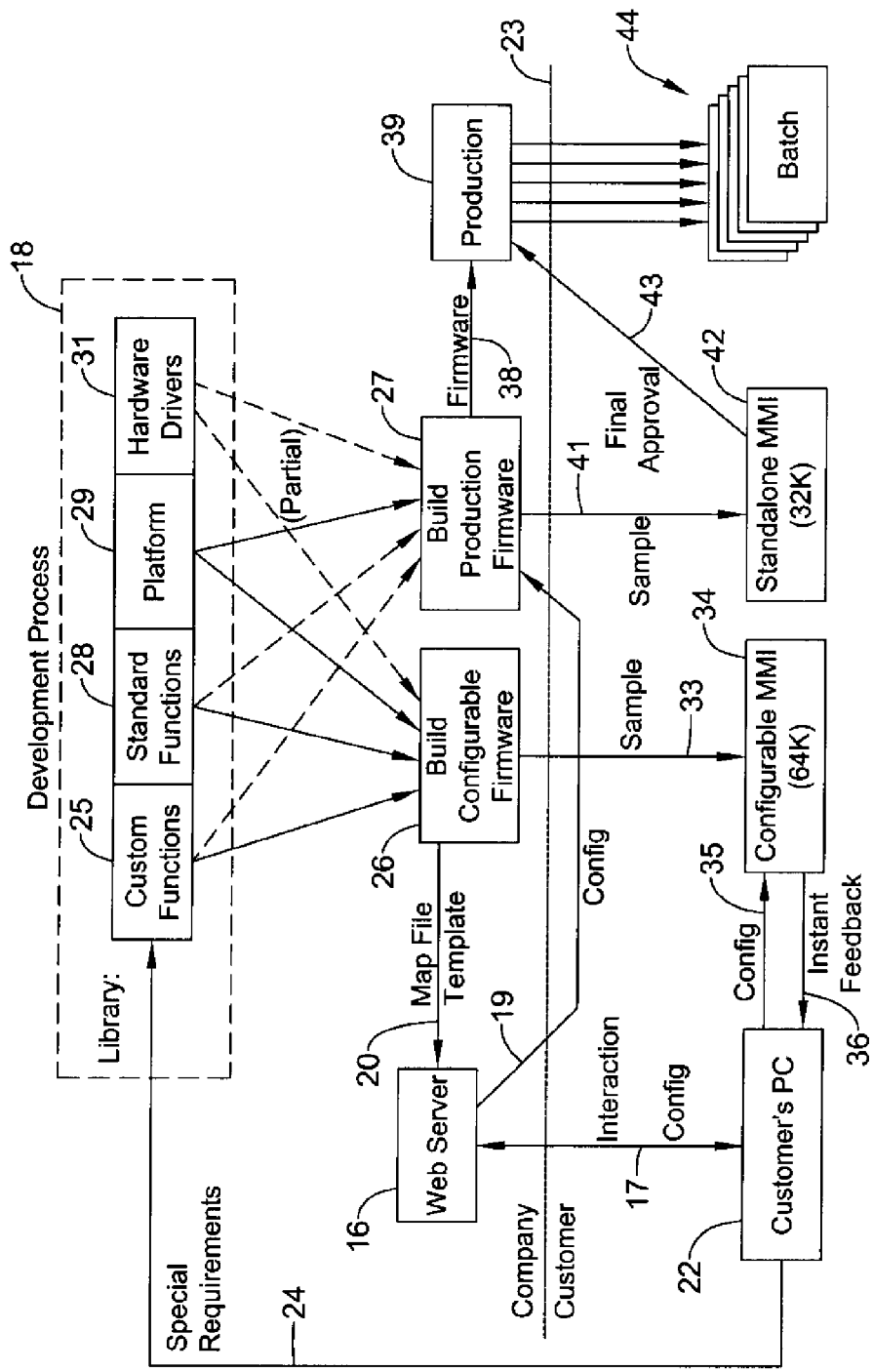
FIG. 5 is a diagram showing usage of CAPI based on a web software oriented development process for firmware to obtain the same results as in FIG. 3.

FIG. 5 is a diagram of a development process for product with embedded CAPI software structure which is a web-based alternative to the development process of FIG. 3. At the beginning of development process is a set of configurable software functions in library 18. This library may contain hardware drivers 31, platform code 29, standard functions 28 and custom functions 25. During the compilation process, a configurable firmware 26 may be built. This firmware may be loaded as a program to the configurable MMI sample 34 and sent to the customer (33). A line 23 shows boundary between the company and customer areas. During the compilation and development process, a map file together with an initial template (20) may be created and uploaded to web server 16. The customer using his PC 22 may invoke communication with company's web server 16 and reconfigure the behavior of the device by an interactive way. On request, the customer may obtain a binary configuration file 17 from the web server 16 and store it on his PC 22. The binary configuration 35 may be uploaded from PC 22 to the configurable MMI sample 34. After uploading, the sample may start to behave according to the modifications made by the customer so it is providing instant feedback 36 to the customer about the effect of customer's changes. In case of very specific demands, customer may ask his special requirements 24 to be implemented into custom functions 25 of the library 18.

On status, when the customer is satisfied with his working sample of configurable man-machine interface device 34, a new production firmware 27 may be built using configuration file 19 coming from web server combined with only utilized functions from library 18, where custom functions 25 and standard functions 28 may be reduced while keeping functionality. If necessary, a sample 41 of standalone man-machine interface device 42 may be provided to the customer. Standalone man-machine interface device 42 may have equivalent functionality compared to the configurable man-machine interface device 34 but may require less memory space. After final approval 43 of the sample of device 42, production 39 may use firmware 38 to start serial production of batches 44 of devices.

Figure 6:
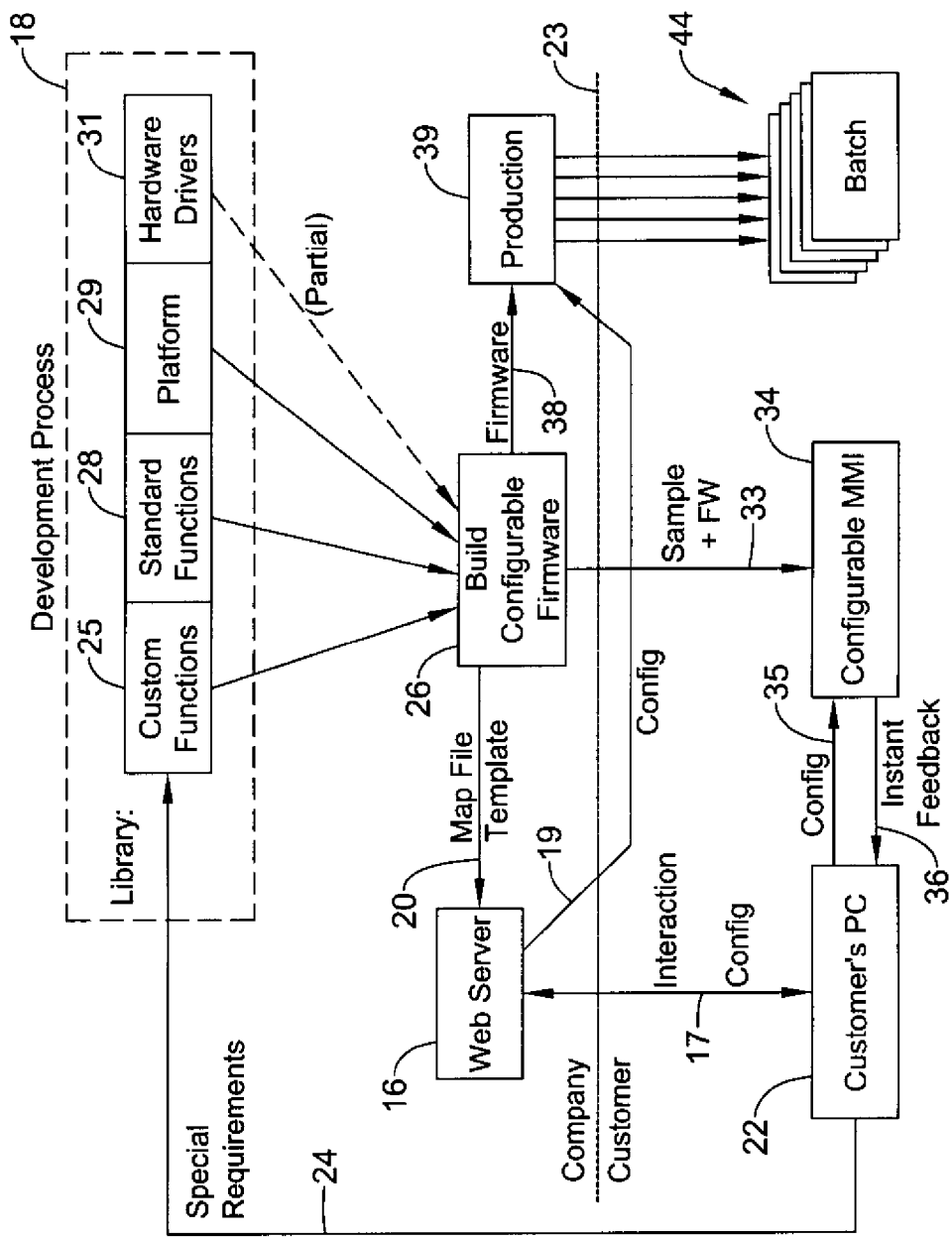
FIG. 6 is a diagram of a development process like that shown in the diagram of FIG. 4 but using a web software oriented approach.

FIG. 6 is a diagram of a development process for product with embedded CAPI software structure which is a web-based alternative to the development process of FIG. 4. At the beginning of the development process is a set of configurable software functions in library 18. This library may contain hardware drivers 31, platform code 29, standard functions 28 and custom functions 25. During the compilation process, a configurable firmware 26 may be built. This firmware may be loaded as a program to the configurable MMI sample 34 and sent to the customer (33). A line 23 shows boundary between the company and customer areas. During the compilation and development process, a map file together with an initial template (20) may be created and uploaded to web server 16. The customer using his PC 22 may invoke communication with company's web server 16 and reconfigure the behavior of the device by an interactive way. On request, the customer may obtain a binary configuration file 17 from the web server 16 and store it on his PC 22. The binary configuration 35 may be uploaded from PC 22 to the configurable MMI sample 34. After uploading, the sample may start to behave according to the modifications made by the customer so it is providing instant feedback 36 to the customer about the effect of customer's changes. In case of very specific demands, customer may ask his special requirements 24 to be implemented into custom functions 25 of the library 18. If customer is satisfied with his reconfiguration of the device, he may ask for a serial production of devices. In this case, configuration file 19 on the web server 16 combined with firmware 38 may be used by production department 39 to produce devices in batches 44.

Figure 7:
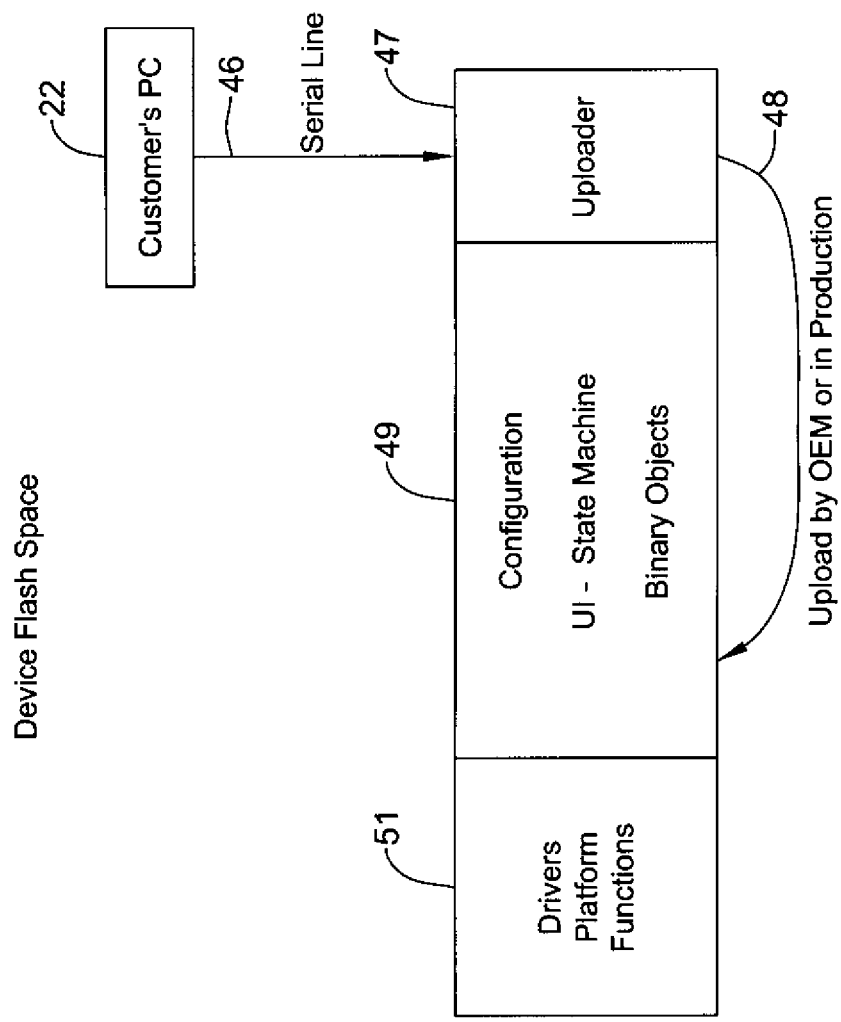
FIG. 7 is a diagram of a device non-volatile memory space arrangement in that such space, here referred as flash space, could be any of the non-volatile memory space in a microcontroller device.

FIG. 7 is a diagram showing a process of uploading binary configuration 49 into the non-volatile (i.e., a flash) memory of the device. Once the customer has a configuration file on his PC 22, he can initiate an uploading process. Data may be sent using a communication line 46 (i.e., a serial line) to the device, where the data are processed by an internal uploader routine 47. The routine may write (48) data to the device reserved segment of non-volatile memory for configuration 49. This segment may consist of any configuration data, state machine as device program and various other binary objects. Part of the non-volatile memory may be left untouched 51; here is typically executable code for microprocessor, e.g., drivers, platform and functions.

Figure 8:
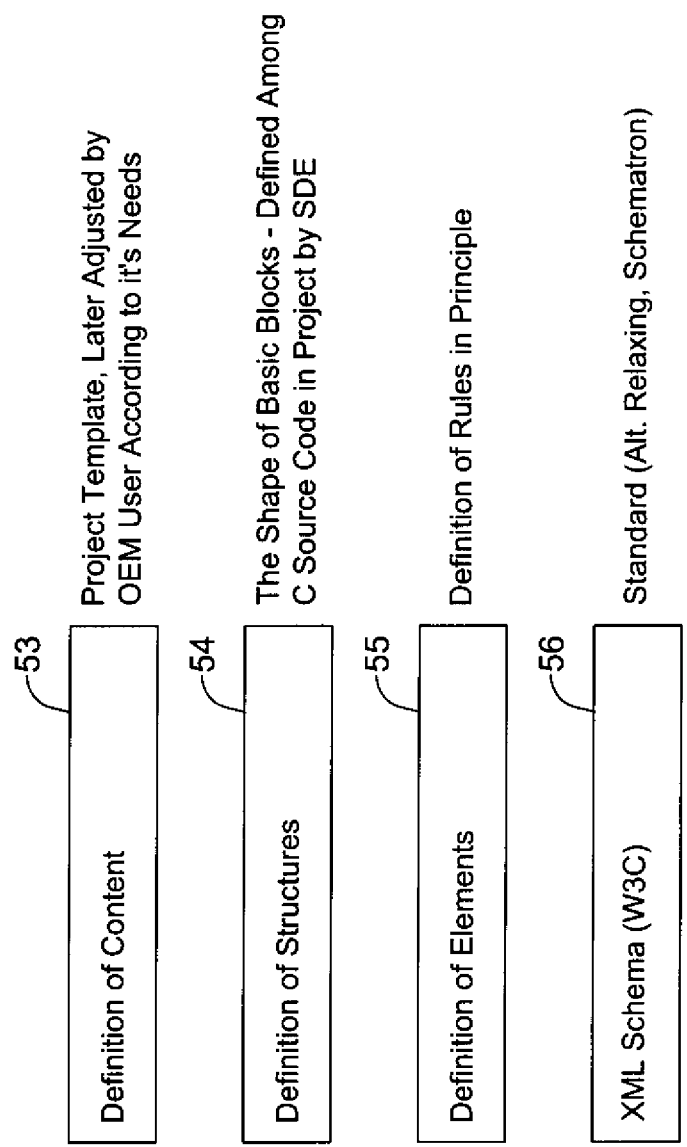
FIG. 8 is a diagram outlining a building configuration of a device based on XML.

FIG. 8 is a diagram outlining hierarchy definition of configurability of a device. A definition of elements 55 may be a definition of rules in principle. An XML schema (like W3C, RelaxNG, Schematron or any other schema language) 56 may be a standard way how to describe element attributes (alternatively, such as, i.e., a language). An interpretation of simple elements, i.e., numbers, references, and so forth, may be hard-coded into PC SW and firmware. The definition of structures 54 may be hand-written by a software programmer or generated by an automated tool and may be in the shape of basic blocks, defined among a source code in a project by a developer. The PC or WEB software may modify the content according to the definition of structures. A definition of content 53 may be initially a project template, which may be changed or adjusted later by an OEM user according to the user's needs.

Figure 9:
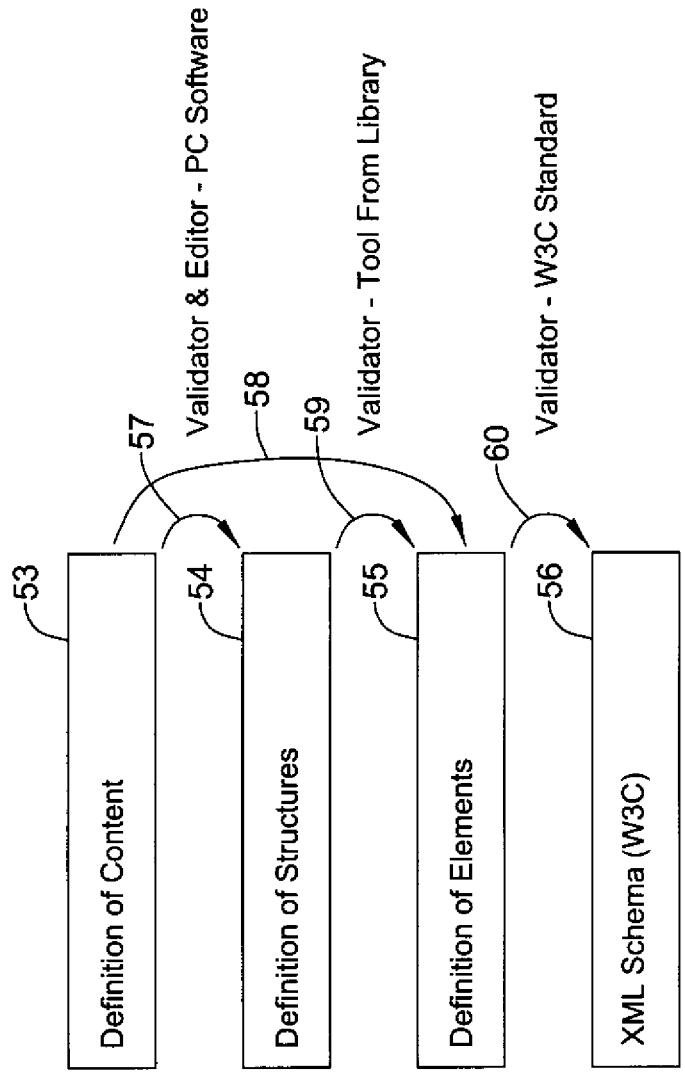
FIG. 9 is a diagram of relationship and validation of a company's definition of configuration and content entered by an OEM.

FIG. 9 is a diagram of relationship and validation. All configuration files may be self-descriptive XML. The structure of all files may be validated against XML. There may be a benefit of using existing software tools as much as possible. Lines 57 and 58 may provide a validator and editor with PC software from definition of content 53 to definition of structures 54 and definition of elements 55, respectively. Line 59 may provide a validator with a tool from a library from definition of structures 54 to definition of elements 55. Line 60 may provide a validator with the W3C standard from definition of elements 55 to XML schema (W3C) 56.

Figure 10:
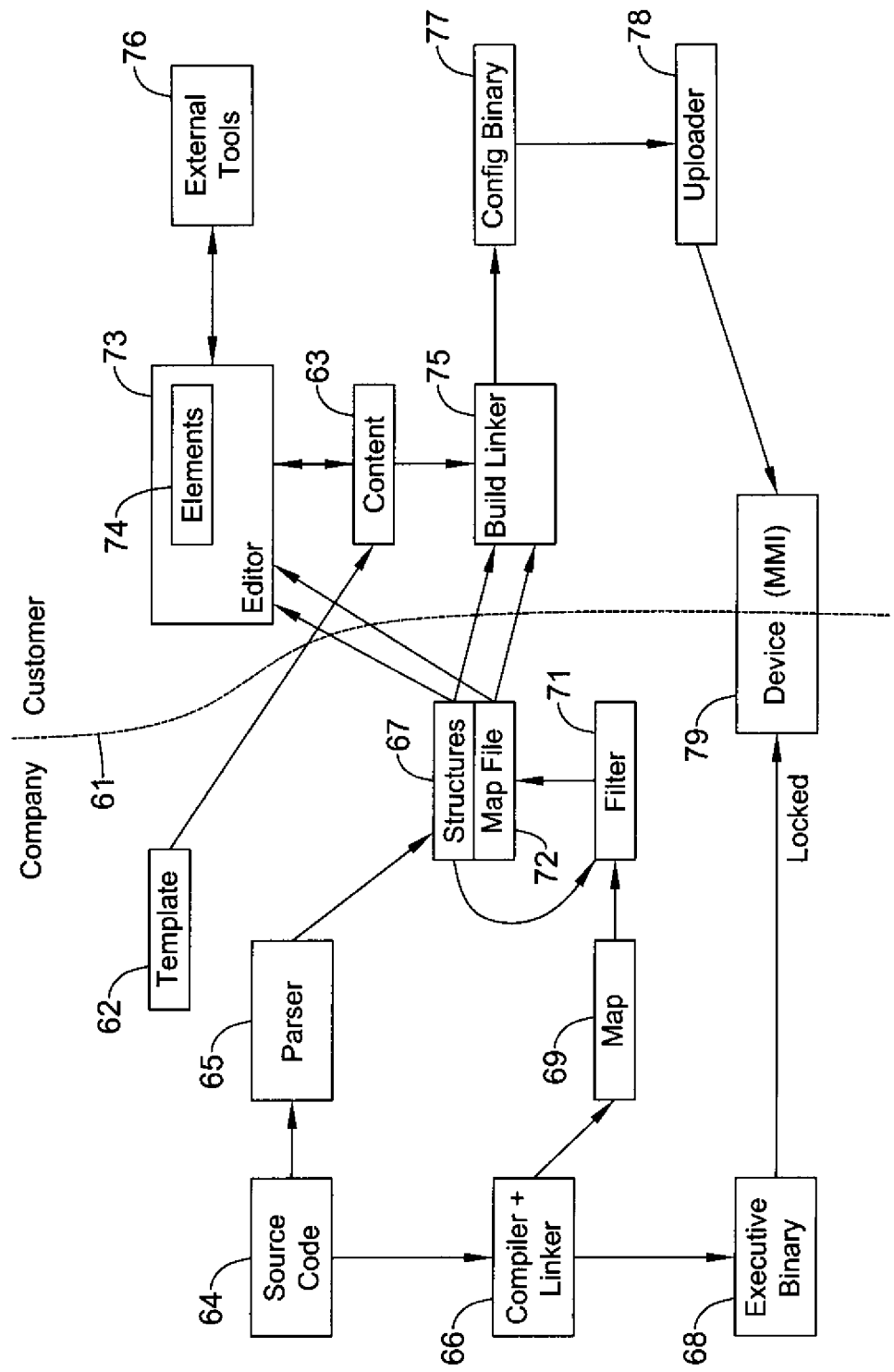
FIG. 10 is a diagram of PC software oriented structure components of a company and customer relative to generating as an example a man-machine interface device using a CAPI development process.

FIG. 10 is a diagram of PC software structure components for a device. Device 79 source code 64 may contain sources of library functions such as custom functions 25, standard functions 28, platform 29 and hardware drivers 31, as shown by library 18 (FIGS. 3-6). The source code 64 may be compiled and linked using compiler and linker 66 resulting in an executable binary 68 which is loaded and locked into device's 79 program memory. During the compilation process, also map 69 may be generated. A file holding structure description 67 may be derived from source code 64 using parsing process 65. Map file 72 may be a filtered version of map 69 using filter 71 tool. A template file 62 may be created describing basic functionality of the device 79. Boundary 61 shows the interaction process between company's software equipment and customer's software equipment. The template 62, structures 67 and map file 72 may be provided to customer together with sample of configurable device with man-machine interface 79. On the customer's computer may be running an editor software 73 capable of modifying a content file 63 according to rules described in structures 67 and map file 72. An initial version of content 63 may be the template 62. Editor software 73 may be able to interpret and modify basic configurable elements 74 or use external tools 76 to perform complex configuration tasks. When the customer is satisfied with the configuration, a build linker software 75 may be launched. Build linker 75 may take content 63 entered by the customer, and using rules and data stored in structures 67 and map file 72 may create binary configuration 77 file. This file may be uploaded by uploader 78 to the device 79. From this moment, the device 79 may act according to the new configuration.

Figure 11:
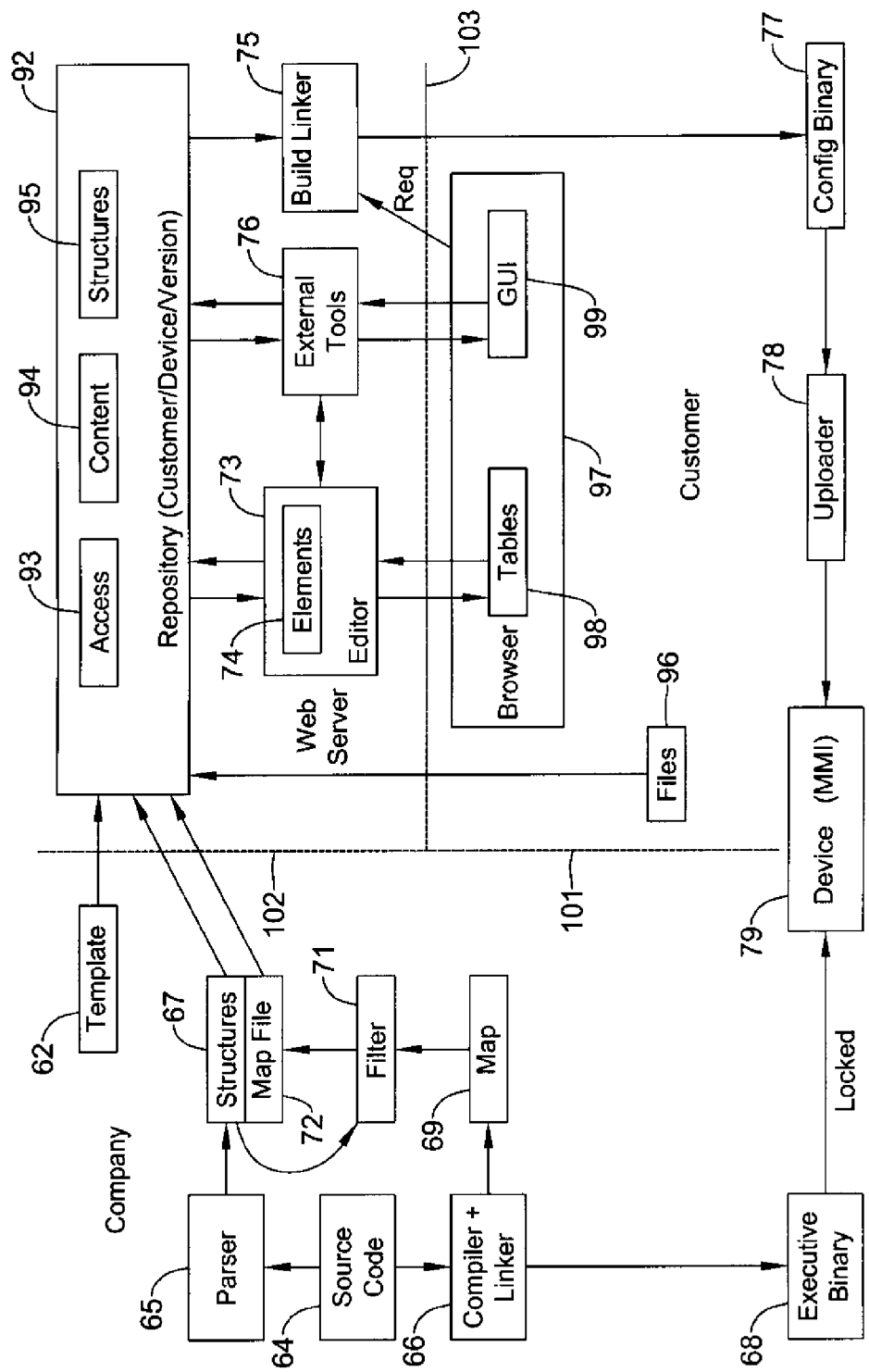
FIG. 11 is a diagram of web software oriented structure components of a company, customer and web server relative to generating as an example a man-machine interface device using the CAPI development process.

FIG. 11 is a diagram of software structure components for a device like that of FIG. 10 but the related to web-based software. Source code 64 may contain sources of library functions such as custom functions 25, standard functions 28, platform 29 and hardware drivers 31 as shown by library 18 (FIGS. 3-6). The source code 64 may be compiled and linked using compiler and linker 66 resulting in executive binary 68 which is loaded and locked into the program memory of device 79. During the compilation process, map 69 may also be generated. File holding structure description 67 may be derived from source code 64 using parsing process 65. Map file 72 may be filtered version of map 69 using filter 71 tool. A template file 62 may be created describing basic functionality of the device 79. In FIG. 11, boundary 102 divides the company's development process and the company's dedicated web server with access available to the customer.

The template 62, structures 67 and map file 72 may be uploaded to repository 92 on the web server together with providing a sample of the configurable device with the man-machine interface 79 to the customer. Repository 92 may include access rights management 93, content storage 94 and structures definition 95. Repository 92 may be accessed by editor software 73 interpreting and optionally modifying basic data elements 74 in content file 94. Optionally, more complex tasks may be performed by external tools 76. In FIG. 11, boundary 103 divides web server software and customer's computer software, while boundary 101 divides the company and customer areas.

The customer may upload specific files 96 to the repository 92 on web server. To modify the configuration, the customer may use web browser 97 to access web server tools, such as editor 73 or external tools 76, while editor 73 interaction may be displayed as a text interaction via tables 98, and external tools 76 may be rendered using advantages of graphical user interface 99. The customer may invoke a downloading action by request from browser 97 to build linker 75. Build linker 75 may process data from repository 92 and create configuration binary file 77, which is downloaded and stored in customer's computer. This file may be uploaded by uploader 78 to the device 79. From this moment, the device 79 may act according to the new configuration.

FIGS. 3, 4 and 10 show the development process and structure for a PC software oriented MMI. If editing runs at a client's PC are fast, the client may have full access to XML files describing structures and also to software itself. These files need to be sent to the customer. The software has to be maintained in a version for a specific operating system and needs to be updated as necessary so as to avoid becoming obsolete.

FIGS. 5, 6 and 11 show the development process and structure for a web software oriented MMI. The CAPI function may fully depend on a connection to the server. The web software may interact with a user via a web browser. Data encryption via https protocol may be available. Special requirements to client's software are not necessarily needed. Data files except those of resulting binary configuration are not necessarily revealed to the customer.

Structures and related information may be noted. A structure file may concern the kind of data structures and objects are incorporated, the relationships between various parts of the configuration, permitted ranges (e.g., for integers), the kind of dialogue-box, external program or other user interaction should be used to import, export and/or modify a certain object or structure, the way to translate some compiled elements into binary data (map file), and the way to build a final binary configuration for upload to a device. A content file may concern the values chosen and entered by a user, the options selected or alternatives chosen by the user, and the objects added to a configuration (bitmaps/fonts) in direct data form or indirect reference. The structures and the content may be turned into binary data which can be interpreted in the device.

Figure 12:
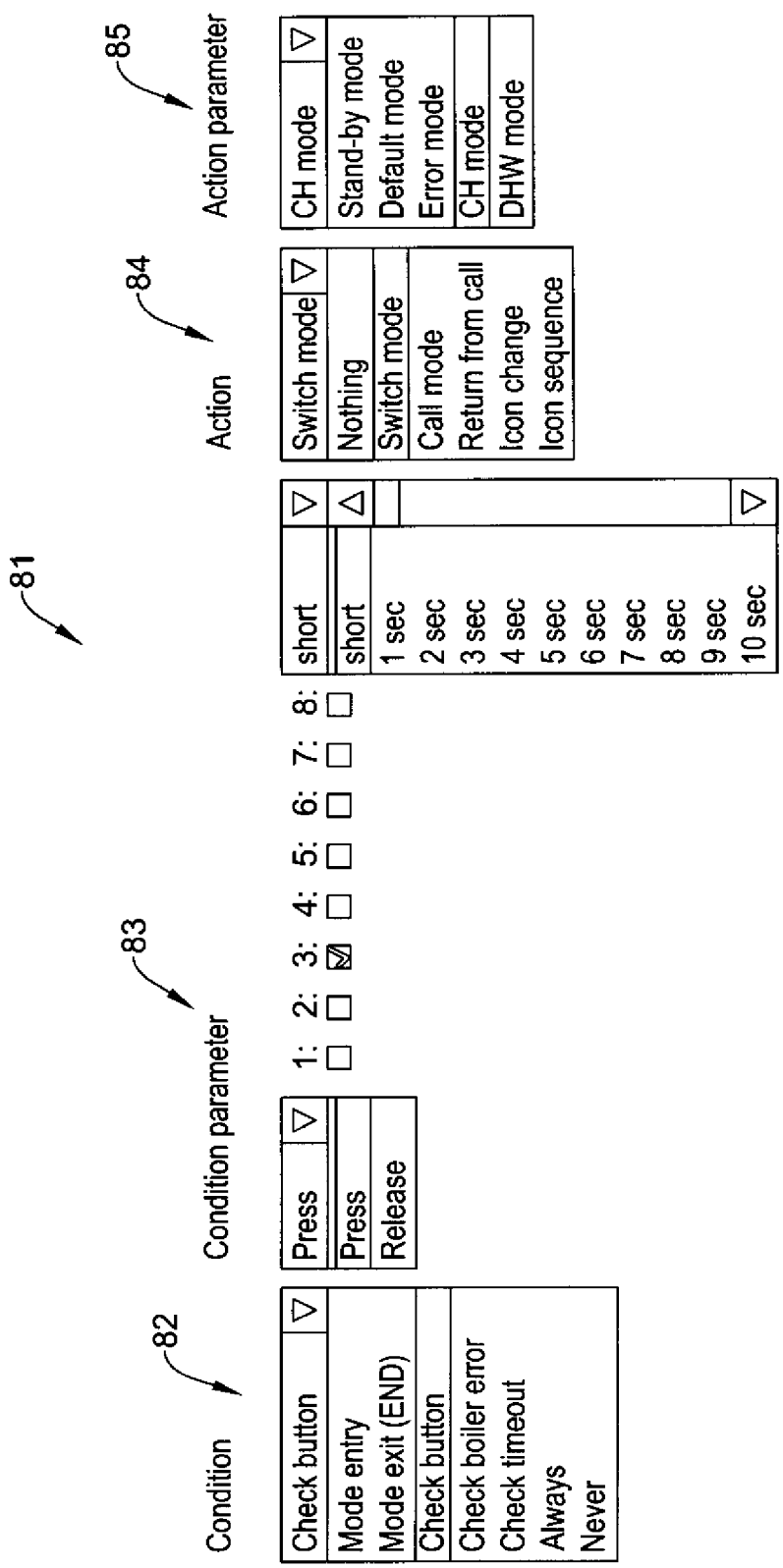
FIG. 12 is a diagram of a screen shot of an example of PC software relative to the present application.

FIG. 12 is a screen shot 81 of an example of PC software. A condition 82 may be noted with some of them being, i.e., a mode entry, mode exit (END), check button, check boiler error, check timeout, always, never, and so on, but not limited to these items. The OEM may have a configurable set of options. A condition parameter may be indicated as a press or a release as noted in FIG. 12. A selection 83 of time may be short or a specified period such as one second or higher. An action 84 may be nothing, a switch mode, a call mode, a return from call, an icon change, an icon sequence, or other item. An action parameter 85 may be a stand-by mode, default mode, error mode, CH mode, DHW mode, or other. Some of the options, such as an action parameter, may be locked by the company.

Figure 13:
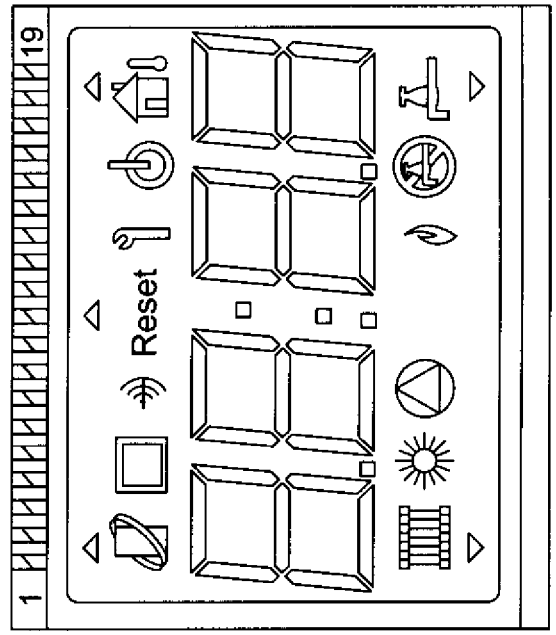
FIG. 13 is a diagram of an external tool example of PC software.

FIG. 13 is a diagram of an external tool example of PC software. The tool may be for modification of sequence of changes on LCD segments. For example, if a boiler error mode is entered, a reset indication and start blink spanner may be shown. A screen shot 87 shows an LCD display with various component controls. Colors may show aspects of portions of the display with for example, white indicating no change, green for showing, red for hiding, and blue for blinking.

The advantages of the adaptive man-machine interface may incorporate the following items. The interface does not necessarily need a compiler or other tool to change behavior of the device, just a PC and/or a WEB based tool is needed. That which is allowed to be adjustable by the OEM may be controlled. The interface may be suitable for embedded devices in the low and mid end, such as small embedded devices without a display, a simple MMI with a segment LCD, and a dot-matrix MMI with icons, graphs and menus. The interface may be fast and small. There may, however, be observable code size savings because of a use of "pseudocode" instead of microprocessor instructions.

Figure 14:
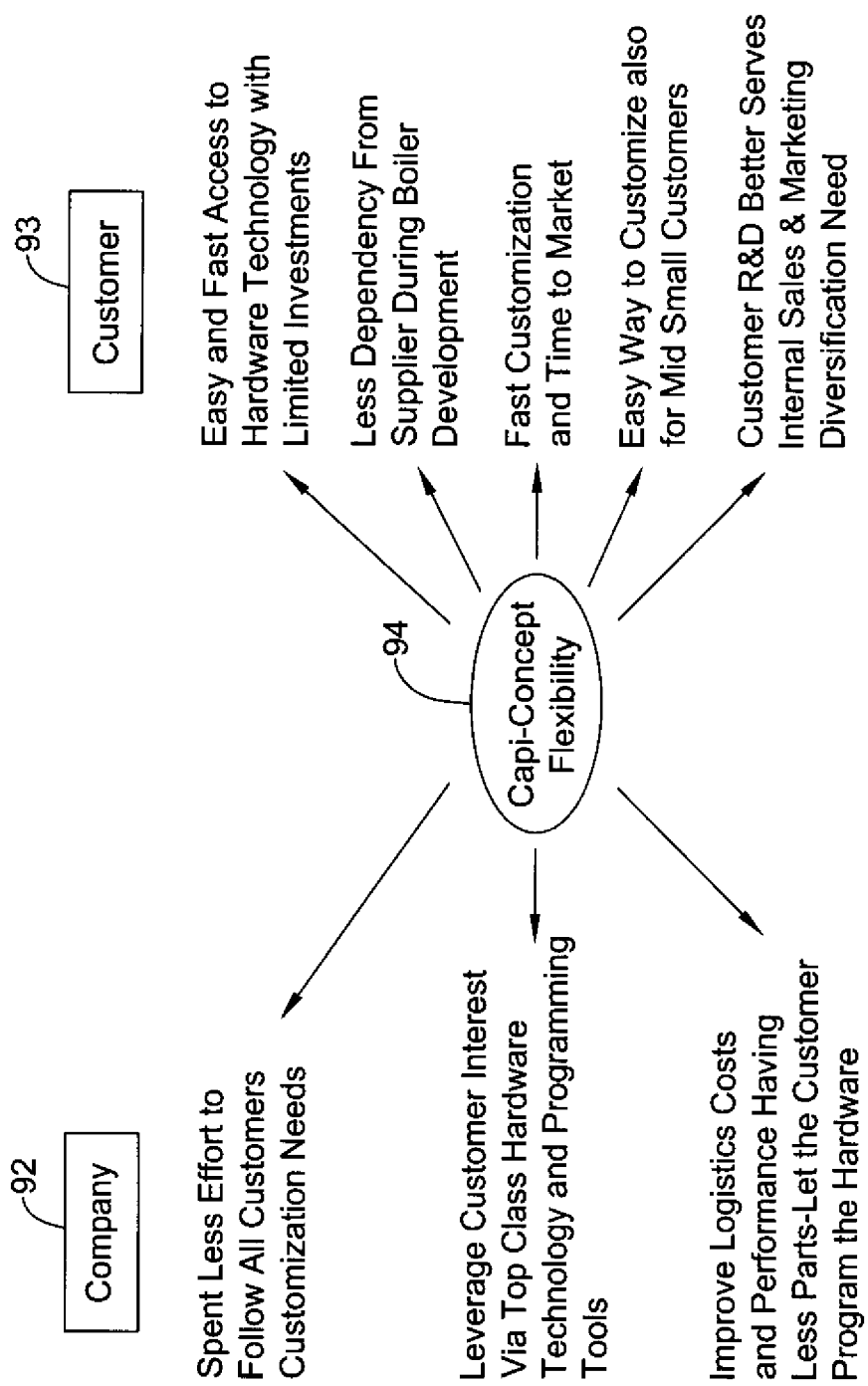
FIG. 14 is a diagram highlighting some of the key advantages of a company advanced programming interface concept of flexibility for a company and a customer.

FIG. 14 is a diagram of a CAPI concept of flexibility 94 for a company 92 and a customer 93. For the company 92, less effort is spent to follow all customers' customization needs. Customer interest may be leveraged via top class hardware technology and programming tools. Also, logistics costs and performance may be improved having less parts and letting the customer program the hardware.

For the customer 93, with CAPI flexibility 94, there may be easy and fast access to hardware technology with limited investments, and less dependency from a supplier during boiler development. There may be fast customization and time to market. There may be an easy way to customize which is applicable for mid to small customers besides the large ones. Also, CAPI flexibility may provide for customer R&D to better serve internal sales and marketing diversification needs.

A recap of the present system may be provided. An approach for providing a company advanced programming interface aiming, via PC software installed on a customer computer, allowing an OEM customer to define its product functionality without need for company involvement in microcontroller programming, compiling, and so forth. The approach may incorporate preparing PC software by a company, installing the PC software on a customer's computer, building configurable firmware from a library, sharing a map file and template from the configurable firmware on the customer's computer, reconfigurating the configurable firmware by the customer on the computer, uploading a reconfigured configuration file to a configurable man-machine interface device having a direct and immediate feedback to the customer of its selected functionality, returning a configuration file by the customer to the company upon satisfaction of the functionality of a sample of the firmware, and on approval producing batches of man-machine interface devices with customer defined functionality.

The approach may also incorporate combining the configuration file with the firmware to produce a standalone man-machine interface with customer defined functionality and smaller non-volatile memory size compared to a configurable device provided to customer as a sample. There may be an optionally sending to customer a new sample of the standalone interface device for final approval. Further there may be combining the configuration file with the configuration firmware for production of a man-machine interface device with customer defined functionality. There may be a company advanced programming interface aiming, via provided web based software accessible by a customer computer allowing an OEM customer to define its product functionality without need for company involvement in microcontroller programming, compiling, and so forth. It may incorporate building configurable firmware from a library, creating and uploading a map file and initial template to a company web server, invoking communication to the company web server by a customer using a computer to reconfigure a man-machine device in an interactive way obtaining, upon request by the customer, a binary configuration file from the web server and storing it on a customer's computer, uploading a reconfigured configuration file to a configurable man-machine interface device having a direct and immediate feedback to the customer of its selected functionality, and combining the configuration file from web server with the firmware to produce a standalone man-machine interface with customer defined functionality on approval producing batches of man-machine interface devices with customer defined functionality. It may further incorporate providing a smaller non volatile memory size compared to configurable device provided to customer as sample, optionally sending to customer a new sample of standalone device for final approval.

The approach may incorporate combining the configuration file from web server with the configuration firmware for production of a man-machine interface device with customer defined functionality.

An approach of configuration of a device by a customer to define its product functionality without need for company involvement in microcontroller programming, compiling, and so forth, may incorporate compiling and linking a source code comprising a library function to result in an executable binary, loading and locking the executable binary into a program memory of a man-machine interface device, generating a map during compilation, deriving a file holding structure from the source code with a parsing process, filtering the map to get a map file, creating a template file that describes basic functionality of the man-machine interface device, providing a sample of a configurable man-machine interface device to the customer, and uploading the binary configuration file to the man-machine interface device, which results in the man-machine interface device acting according to a new configuration. It may further incorporate providing the template file, file holding structure, and map file, running on a customer's computer an editor software capable of modifying a content file according to rules of the file holding structure and the map file, wherein an initial version of the content file is the template file, interpreting and modifying basic configurable elements with editor software, or performing complex configuration tasks with external tools, upon customer satisfaction with a resulting configuration, launching build linker software on request, and taking content entered by a customer and using rules and data stored in the file holding structure and map file to create a binary configuration file with a build linker. It may incorporate uploading the template file, the file holding structure and map file to a repository on a web server, accessing a repository with editor software to perform tasks of interpreting and optionally modifying basic data elements, and/or with external tools to perform more complex tasks, uploading by a customer, specific files to the repository on a web server, accessing web server tools, such as editor software and external tools, to modify a configuration of the man-machine interface device, with a web browser by the customer, and downloading invoked by the customer via the web browser to get a build linker to process data from the repository to create a configuration binary file which is stored in a computer of the customer.

A system for providing an advanced programming interface may incorporate a customer computer, a build of PC software provided to the customer computer by company, a configurable man-machine interface connected to the computer via a communication interface, a modifiable library able to satisfy special requirements from a customer and compilable to an executable binary firmware program for the device, configurable firmware compiled from the library and uploaded to the configurable man-machine interface, and production firmware compiled from reduced and customized functions from the library, uploaded to a standalone man-machine interface.

It may further incorporate alternately server hosted web software. The build of software may be for building software for the customer computer. The customer may provide a request for special requirements which represent missing and expected functionality from the customer to be implemented into the library, and in response to the request the library compiles into the new version of configurable firmware to be verified by customer, and on satisfaction the latest version of the library is compiled to production firmware avoiding library functions unused by the customer, and such recompilation can save an economically reasonable amount of non-volatile memory space in device.

A source code of the configurable firmware may provide during a compilation process a map file and template to a customer's installation of PC software or server hosted WEB software and a sample of the configurable man-machine interface with configurable firmware sent to customer. After the customer enters or modifies data in the computer, or the customer modifies data on a web server, computer or server may provide configuration information to the configurable man-machine interface, and the configurable man-machine interface may provide a virtually instant feedback to the customer.

The customer may provide a configuration file to compile production firmware from library. The production firmware may be installed to additional sample of a standalone man-machine interface sent to the customer for final verification before serial production of devices with the firmware. The customer provides final approval to production, and the production may start producing batches of devices with approved firmware. The library may have custom functions, standard functions, a platform and hardware drives as needed for the configurable firmware and the production firmware. A serial production may use production firmware to produce customized devices in batch. The computer or web server, the configurable man-machine interface, the standalone man-machine interface, and the batch may be accessible by the customer, and the build software module, the library, the production may be property of a company. The computer may be a PC, the web server may be a service provided by the company, and the customer may be a customer of the company.

In the present specification, some of the matter may be of a hypothetical or prophetic nature although stated in another manner or tense.

Although the present system has been described with respect to at least one illustrative example, many variations and modifications will become apparent to those skilled in the art upon reading the specification. It is therefore the intention that the appended claims be interpreted as broadly as possible in view of the prior art to include all such variations and modifications.

What is claimed is:

1. A method executable by central processing units for providing a company advanced programming interface aiming, via personal computer (PC) software installed on a customer computer, to allow an original equipment manufacturer customer to define its product functionality without need for company involvement in microcontroller programming and compiling, comprising:
preparing PC software by a company;
installing the PC software on a customer's computer;
building configurable firmware from a library at the company;
sharing a map file and template from the configurable firmware on the customer's computer;
reconfiguring the configurable firmware by the customer on the computer with the PC software;
uploading a first reconfigured configuration file to a configurable man-machine interface device having a direct and immediate feedback to the customer of its selected functionality;
returning a second reconfigured configuration file by the customer to the company upon satisfaction of the functionality of a sample of the firmware after receiving feedback from the configurable man-machine interface device; and
on approval producing batches of man-machine interface devices with customer defined functionality.

2. The method of claim 1, further comprising combining the configuration file with the firmware to produce a standalone man-machine interface with customer defined functionality and smaller non-volatile memory size compared to a configurable device provided to customer as a sample.

3. The method of claim 2, further comprising optionally sending to customer a new sample of the standalone interface device for final approval.

4. The method of claim 1 further comprising combining the configuration file with the configuration firmware for production of a man-machine interface device with customer defined functionality.

5. A method executable by central processing units for providing a company advanced programming interface aiming, via provided web based software accessible by a customer computer, to allow an original equipment manufacturer customer to define its product functionality without need for company involvement in microcontroller programming and compiling, comprising:
building configurable firmware from a library;
creating and uploading a map file and initial template to a company web server;
invoking communication to the company web server by a customer using a computer to reconfigure a man-machine device in an interactive way;
obtaining, upon request by the customer, a binary configuration file from the web server and storing it on a customer's computer;
uploading a reconfigured configuration file to a configurable man-machine interface device having a direct and immediate feedback to the customer of its selected functionality;
combining the configuration file from web server with the firmware to produce a standalone man-machine interface with customer defined functionality; and
on approval producing batches of man-machine interface devices with customer defined functionality.

6. The method of claim 5, further comprising providing a smaller non volatile memory size compared to configurable device provided to customer as sample.

7. The method of claim 6, further comprising optionally sending to customer a new sample of standalone device for final approval.

8. The method of claim 5, further comprising combining the configuration file from web server with the configuration firmware for production of a man-machine interface device with customer defined functionality.

9. A method executable by central processing units for configuration of a device by a customer to define its product functionality without need for company involvement in microcontroller programming and compiling, comprising:
compiling and linking a source code comprising a library function to result in an executable binary;
loading and locking the executable binary into a program memory of a man-machine interface device;
generating a map during compilation;
deriving a file holding structure from the source code with a parsing process;
filtering the map to get a map file;
creating a template file that describes basic functionality of the man-machine interface device;
providing a sample of a configurable man-machine interface device to the customer; and
uploading the binary configuration file to the man-machine interface device, which results in the man-machine interface device acting according to a new configuration.

10. The method of claim 9, further comprising:
providing the template file, file holding structure, and map file;
running on a customer's computer an editor software capable of modifying a content file according to rules of the file holding structure and the map file, wherein an initial version of the content file is the template file;
interpreting and modifying basic configurable elements with editor software, or performing complex configuration tasks with external tools;
upon customer satisfaction with a resulting configuration, launching build linker software on request; and
taking content entered by a customer and using rules and data stored in the file holding structure and map file to create a binary configuration file with a build linker.

11. The method of claim 9, further comprising:
uploading the template file, the file holding structure and map file to a repository on a web server;
accessing a repository with editor software to perform tasks of interpreting and optionally modifying basic data elements, more complex tasks using external tools, or tasks of interpreting and optionally modifying basic data elements and more complex tasks with external tools;

uploading by a customer, specific files to the repository on a web server;

accessing web server tools, such as editor software and external tools, to modify a configuration of the man-machine interface device, with a web browser by the customer; and downloading invoked by the customer via the web browser to get a build linker to process data from the repository to create a configuration binary file which is stored in a computer of the customer.

12. A system comprising:
a customer computer;
the system configured to implement:
a company advanced programming interface aiming, via personal computer (PC) software installed on a customer computer, to allow an original equipment manufacturer customer to define its product functionality without need for company involvement in microcontroller programming and compiling;
a build of PC software provided to the customer computer by company;
install the PC software on a customer's computer;
build configurable firmware from a library at the company; and
sharing a map file and template from the configurable firmware on the customer's computer;
reconfigure the configurable firmware by the customer on the computer with the PC software;
a configurable man-machine interface connected to the computer via a communication interface;
upload a first reconfigured configuration file to the configurable man-machine interface device having a direct and immediate feedback to the customer of its selected functionality;
returning a second reconfigured configuration file by the customer to the company upon satisfaction of the functionality of a sample of the firmware after receiving feedback from the configurable man-machine interface device; and
a modifiable library able to satisfy special requirements from the customer and able to be compiled to an executable binary firmware program for the device;
configurable firmware compiled from the library and uploaded to the configurable man-machine interface; and
production firmware compiled from reduced and customized functions from the library, uploaded to a standalone man-machine interface.

13. The system of claim 12, further comprising alternately server hosted web software.

14. The system of claim 13, wherein:
the build of software is for building software for the customer computer;

the customer may provide a request for special requirements which represent missing and expected functionality from the customer to be implemented into the library; and in response to the request the library compiles into the new version of configurable firmware to be verified by customer; and on satisfaction the latest version of the library is compiled to production firmware avoiding library functions unused by the customer, and such recompilation can save an economically reasonable amount of non-volatile memory space in device.

15. The system of claim 14, wherein:
a source code of the configurable firmware provides during a compilation process a map file and template to a customer's installation of PC software or server hosted WEB software and a sample of the configurable man-machine interface with configurable firmware sent to customer;
after the customer enters or modifies data in the computer, or the customer modifies data on a web server, computer or server provides configuration information to the configurable man-machine interface; and
the configurable man-machine interface provides a virtually instant feedback to the customer.

16. The system of claim 15, wherein:
the customer provides a configuration file to compile production firmware from library;
the production firmware is installed to additional sample of a standalone man-machine interface sent to the customer for final verification before serial production of devices with the firmware;
the customer provides final approval to production; and
the production starts producing batches of devices with approved firmware.

17. The system of claim 16, wherein the library comprises custom functions, standard functions, a platform and hardware drives as needed for the configurable firmware and the production firmware.

18. The system of claim 17, wherein a serial production uses production firmware to produce customized devices in batch.

19. The system of claim 18, wherein:
the computer or web server, the configurable man-machine interface, the standalone man-machine interface, and the batch are accessible by the customer; and
the build software module, the library, the production are property of a company.

20. The system of claim 19, wherein:
the computer is a PC;
the web server is a service provided by the company; and
the customer is a customer of the company.

* * * * *